(12) United States Patent
Huntington et al.

(10) Patent No.: US 7,175,512 B2
(45) Date of Patent: Feb. 13, 2007

(54) CUTTING CHAIN GRINDER AND METHOD OF GRINDING

(75) Inventors: Kent L. Huntington, Molalla, OR (US); Daniel Haile, Portland, OR (US)

(73) Assignee: Blount, Inc., Portland, OR (US)

( * ) Notice: Subject to any disclaimer, the term of this patent is extended or adjusted under 35 U.S.C. 154(b) by 0 days.

(21) Appl. No.: 11/064,903

(22) Filed: Feb. 22, 2005

(65) Prior Publication Data

US 2005/0183545 A1    Aug. 25, 2005

(51) Int. Cl.
  *B24B 3/00*  (2006.01)
(52) U.S. Cl. .................. 451/234; 451/236; 76/80.5
(58) Field of Classification Search ........... 451/236, 451/229, 234, 232; 76/80.5, 25.1, 42, 37
  See application file for complete search history.

(56) References Cited

U.S. PATENT DOCUMENTS

| | | | | | |
|---|---|---|---|---|---|
| 2,318,456 | A | * | 5/1943 | Blum | 76/43 |
| 3,779,103 | A | * | 12/1973 | Silvey | 76/80.5 |
| 4,069,620 | A | * | 1/1978 | Sakcriska | 451/28 |
| 4,094,101 | A | * | 6/1978 | Robinson | 451/72 |
| 4,120,215 | A | * | 10/1978 | Kaye | 76/80.5 |
| 4,416,169 | A | * | 11/1983 | Silvey | 76/80.5 |
| 4,683,780 | A | * | 8/1987 | Robison | 76/40 |
| 5,649,694 | A | * | 7/1997 | Buck | 269/43 |
| 5,906,534 | A | * | 5/1999 | Folkman et al. | 451/45 |
| 6,142,856 | A | * | 11/2000 | Romhild | 451/279 |
| 6,589,104 | B2 | * | 7/2003 | Andrea | 451/229 |

* cited by examiner

*Primary Examiner*—Jacob K. Ackun, Jr.
(74) *Attorney, Agent, or Firm*—Schwabe Williamson & Wyatt

(57) ABSTRACT

A cutting chain bench grinder includes a self-centering vise that centers the cutting chain on an axis of rotation of the vise base. By centering the cutting chain to intersect the vise base axis of rotation, consistent top plate lengths and hook angles can be ground into left and right-hand cutters on a cutting chain. The vise base may also be adjusted horizontally in and out from the grinder base to align the vise base axis of rotation with the axis of rotation of the grinding wheel. The vise base may also be adjusted vertically relative to the vise base to vertically compensate for grinding wheel wear and to control grinding depth. A light tension spring may be used to bias the grinding head in both grinding and dressing positions. A down angle positioner may also be provided that rotates the cutting chain in the vise around a longitudinal centerline of the cutting chain.

20 Claims, 10 Drawing Sheets

CUTTING CHAIN GRINDER AND METHOD OF GRINDING

TECHNICAL FIELD

This disclosure relates to cutting chains for chainsaws and more particularly to the maintenance grinding of the cutters on the cutting chain.

BACKGROUND OF THE DISCLOSURE

To maintain their sharpness, cutters on cutting chains must be ground after periods of use and whenever the cutting chain encounters rocks, contaminated wood, or other anomalous material. The cutters are sharpened on the chain by placing the chain in a bench grinder 20.

FIG. 2 shows a typical cutter 36 with reference numbers identifying critical features which will be described more fully below including top plate length 42 and top plate angle 34.

A depiction of a common bench grinder 20 is shown in FIG. 1. The common bench winder 20 has three main components: the grinder head 22 containing the grinding wheel 24; the grinder base 26; and the vise 28. The grinder head 22 is attached to the grinder base 26 at a top back pivoting binge 30. The vertical angle of the grinding wheel 24 can be adjusted between 90° and 45° to adjust the cutler top plate sharpness angle 32 (See FIG. 2). The vise 28 can be angularly positioned around an axis that is substantially normal to the horizontal plane of the grinder base 26 between angles of about 40° and −40° to adjust the top plate angle 34 (See FIG. 2) of the cutter 36. Some grinders are equipped with a tilting portion (not shown) that tilts the cutter 36 to create a sharper angle at the overthrow edge 38 (See FIG. 2) of the cutter 36.

Grinding cutters 36 includes securely clamping the chain 40 between two rails on the vise 28. The cutters 36 alternate on the chain between left-handed and right-handed cutters. One orientation of cutters (e.g., the left-handed cutters) are ground first, with the chain 40 being positioned longitudinally in the vise 28 with the cutter 36 positioned against a cutter stop (not shown).

The grinder 20 must be adjusted for grinding in the following order: 1) the grinder head 20 is angularly adjusted to grind the top plate sharpness angle 32 (see FIG. 2); 2) the vise 28 is angularly adjusted in its base to set the top plate cutting angle 34 (see FIG. 2); 3) the down angle is adjusted by tilting the vise 28; 4) the depth of grinding is adjusted using the depth stop 44 which is set by lowering the grinding wheel 24 down until the grinding wheel 24 touches the gullet 46 (see FIG. 2) of the cutter 36; and, 5) the cutter stop is longitudinally positioned on the vise to adjust the top plate length 42 of the cutter 36.

The same procedure is followed for cutting the opposite hand cutters by rotating the vise 28 to reset the top plate angle 34.

With current grinders on the market it is difficult to achieve the same hook angle 48 and top plate length 42 between the right and left handed cutters on a change. This difficulty is mainly due to the fact that the vise 28 has one side fixed to the vise base and a second side that adjusts in and out for clamping the chain 40 in the vise 28. When the vise 23 is rotated to cut opposite hand cutters, the fixed side of the vise 28 changes relative to the grinding wheel and the operator must then readjust the longitudinal position of the cutter stop on the vise to try and make the top plate lengths 42 the same for both left and right hand cutters. This adjustment also creates a difference in the hook angle 48 between the left and right handed cutters. Differences in top plate lengths 42 between left and right handed cutters 36 beyond 0.020 inches can cause undesirable differences in the hook angle 48 between the left and right handed cutters 36. When the hook angle 48 varies much beyond 4° between the left and right handed cutters 36, the cutting chain 40 will have a tendency to pull from a chain saw one direction or the other when in use.

Additionally, current grinders utilize a stiff torsional spring 50 on the hinge 30 to bias the position of the grinding head 22. To overcome the stiffness of the torsional spring 50, the grinders 20 include a large handle 52. Overcoming the stiffness of the torsional spring 50 can lead to an operator pressing the grinding wheel 24 down too hard and thereby causing the grinding wheel 24 to grind the cutter 36 too deeply, even burning the cutter 36. Also, the torsional spring 50 is difficult to replace when it breaks because it requires disassembly of the grinder head 22 from the grinder base 26.

Embodiments of the invention address these and other disadvantages in current cutting chain grinders.

BRIEF DESCRIPTION OF THE DRAWINGS

The description may be best understood by reading the disclosure with reference to the accompanying drawings.

DETAILED DESCRIPTION

Figure 3:
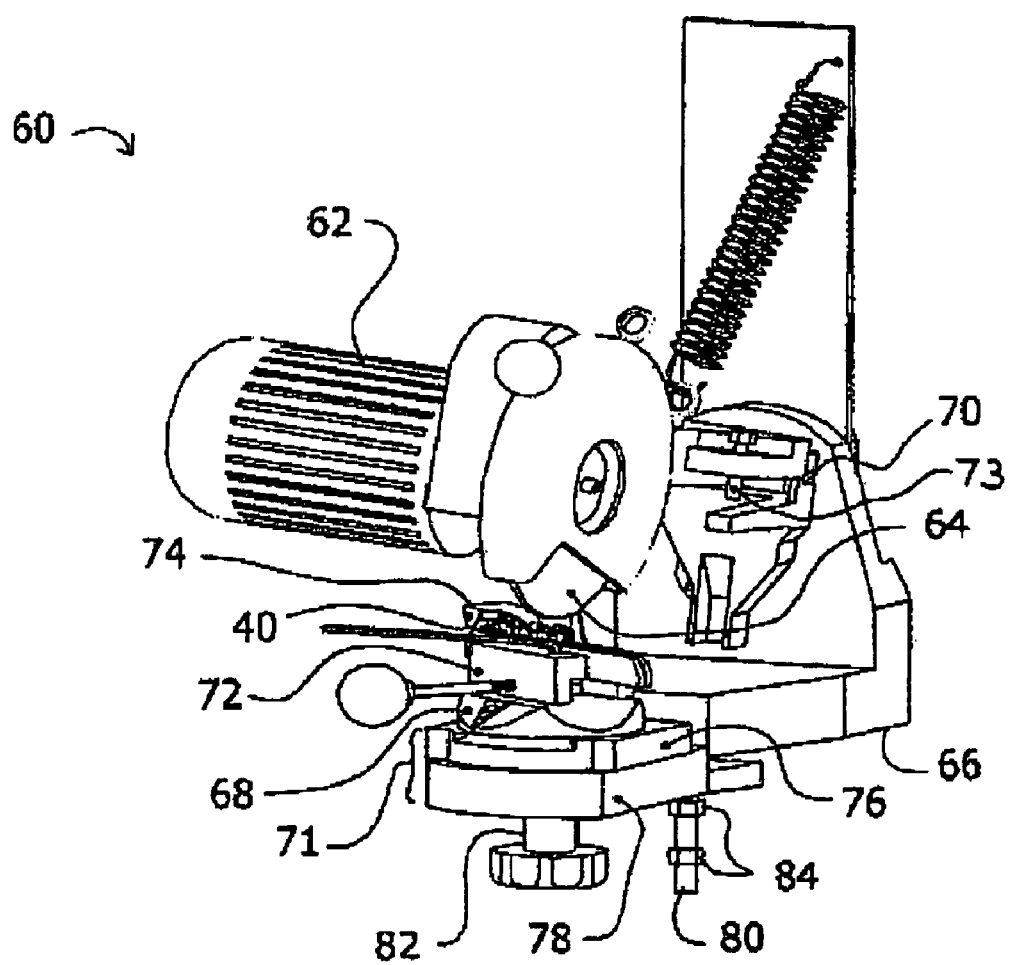
FIG. 3 is a perspective view of a cutting chain grinder according to an embodiment of the invention.

FIG. 3 is a perspective view of a cutting chain grinder 60 according to an embodiment of the invention. Grinding head 62 housing the grinding wheel 64 is mounted on the grinder base 66 at hinge 70. A self-centering chain vise assembly 68 is mounted on a front portion 71 of the grinder base 66. The chain vise assembly 68 includes self-centering vise 72 which holds chain 40 for grinding.

The self centering chain vise assembly 68, like current grinders, is rotationally adjustable about an axis of rotation that is substantially normal to a horizontal plane of the vise assembly 68. The self-centering chain vise assembly 68 is positioned and adapted to adjust both sides of the vise 72 such that the longitudinal centerline of the cutting chain 40 intersects the axis of rotation of the vise assembly 68. By always centering the cutting chain 40 on the axis of rotation of the vise assembly 68, the cutter stop 74 need not be readjusted after rotating the vise assembly 68 to grind an opposite handed cutter 36.

The self-centering chain vise assembly 68 is mounted on vise base 71. Vise base 71 includes horizontally adjustable upper base 76 and lower base 78. The upper base 76 can be positioned horizontally in an out from the grinder base 66 to allow the axis of rotation of the vise assembly 68 to intersect the axis of rotation of the grinding wheel 64. This horizontal adjustment allows an operator to compensate for wear on the grinding wheel 64 to maintain consistent grinding angles and lengths on the cutter 36.

The lower base 78 is vertically adjustable up and down relative to the grinder base 62 on posts 80 and 82. Post 80 is threaded and includes nuts 84 that allow for precise vertical adjustment of the lower base 78 and thereby the vise assembly 68 and chain 40. The vertical adjustment of lower base 78 allows an operator adjust the position of the vise assembly 68 to vertically compensate for wear on the grinding wheel 64.

Current grinders vertically compensate for wheel wear by adjusting a grinder stop 23 (see FIG. 1) which adjusts the angular travel of the grinding head 22. The grinder 60 allows for more precise vertical compensation for wear on the grinding wheel 64. On Grinder 60, the grinding head 62 is rotated about hinge 70 and grinder stop 73 is adjusted to angularly position the grinding head at about 90° from vertical. The vertical position of the vise assembly 68 is then adjusted my moving lower base 78 up or down posts 80, 82 until the grinding wheel 64 contacts the gullet 46 of cutter 36 (see FIG. 2). The vertical adjustment allows an operator to vertically compensate for wear on the grinding wheel 64 and precisely adjust grinding depth.

Figure 4:
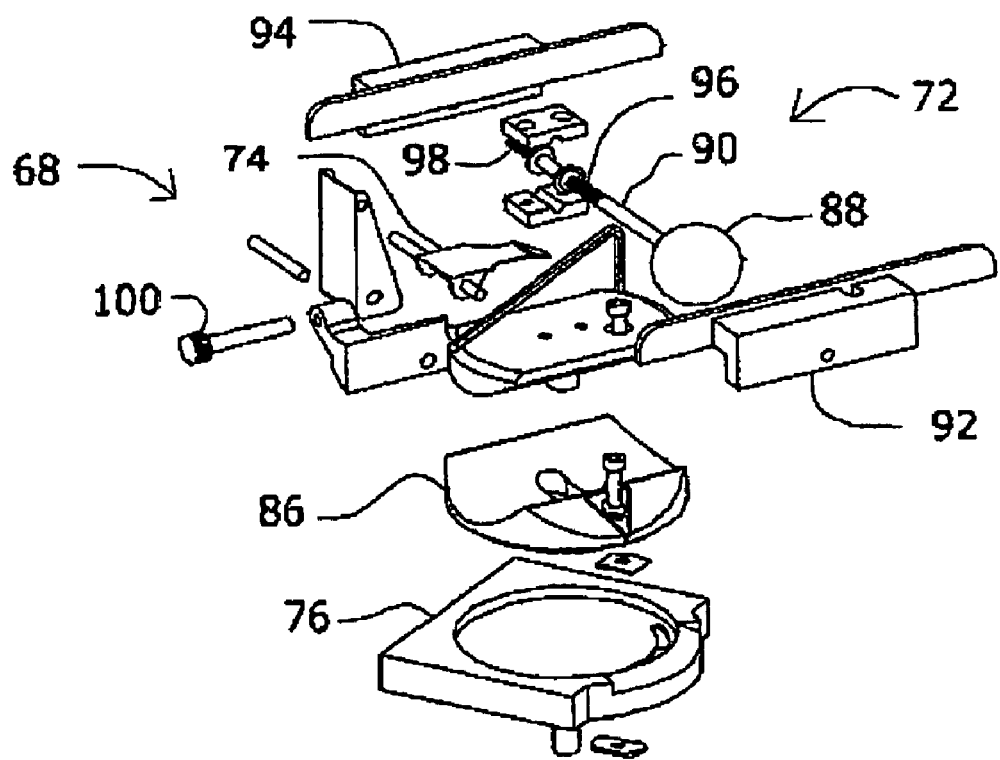
FIG. 4 is a detailed exploded view of the vise base assembly of the cutting chain grinder of FIG. 3.

FIG. 4 is an exploded perspective view of the self-centering chain vise assembly 68, down angle positioner 86 and upper vise base 76. The self-centering vise 72 includes handle 88 that has a rod 90 extending through first and second sides 92, 94 of the vise 72. The rod 90 engages the sides 92 and 94 with right-hand threads 96 in side 92 and left hand threads 98 in side 94. The opposite-handed threads 96 and 98 move sides 92 and 94 of the vise together or apart from each other depending on the rotation of the handle 88. This allows the vise 72 to self-center in the vise assembly 68.

The cutter stop 74 is mounted on the vise 72 and stop positioner100 longitudinally adjusts the position of the cutter stop 74. As described above, the longitudinal position of the cutter stop 74 need only be adjusted once on grinder 60 for a given chain 40 with the same cutter stop 74 position being used to grind both left and right handed cutters 36.

The chain vise assembly is mounted on the upper vise base 76 via the down angle positioner 86 which will be described in more detail in relation to FIG. 10.

Figure 5:
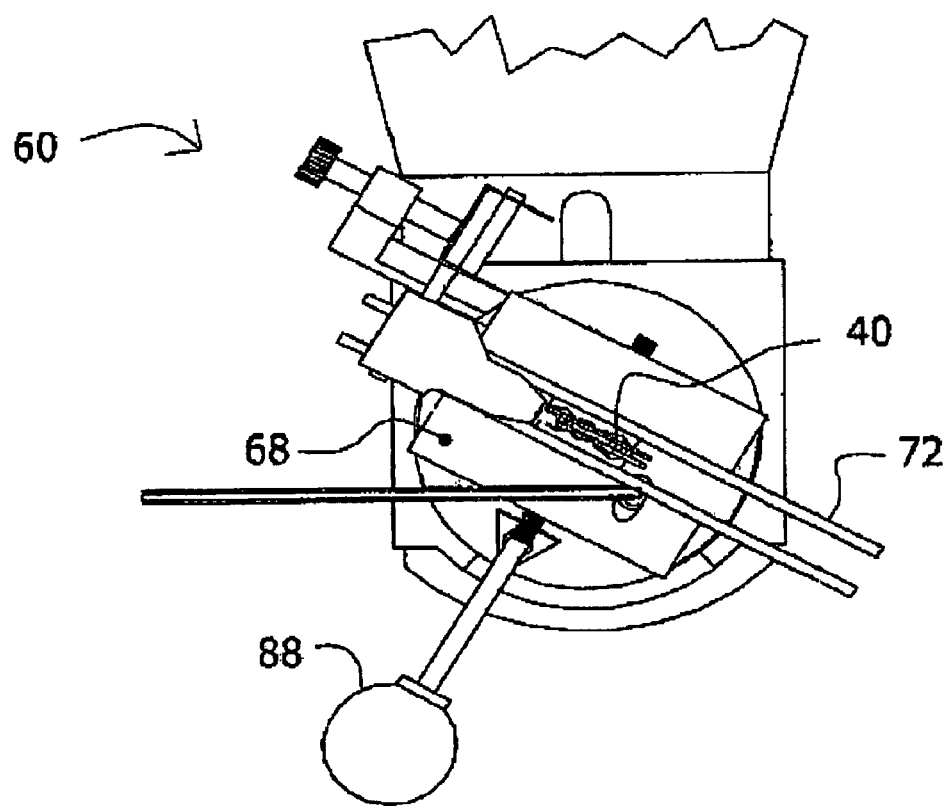
FIG. 5 is a detailed top plan view of the vise base assembly of FIG. 4 showing the vise in an open position.

FIG. 5 is a detailed top plan view of the grinder 60 showing the vise 72 in an open position and the chain vise assembly rotationally positioned to grind a left handed cutter 36 on the chain 40. The vise assembly 68 is sized and adapted to receive and hold various sizes and chain types including but not limited to 11BC (0.090 Gauge), 18H (0.080 Gauge), 27 (0.063 Gauge), 75LG (0.063 Gauge), 33LG (0.050 Gauge), and 35LG (0.063 Gauge). Handle 88 is rotated to close the vise 72 to hold the chain 40, centering the chain 40 on the axis of rotation of the chain vise assembly 68.

Figure 6:
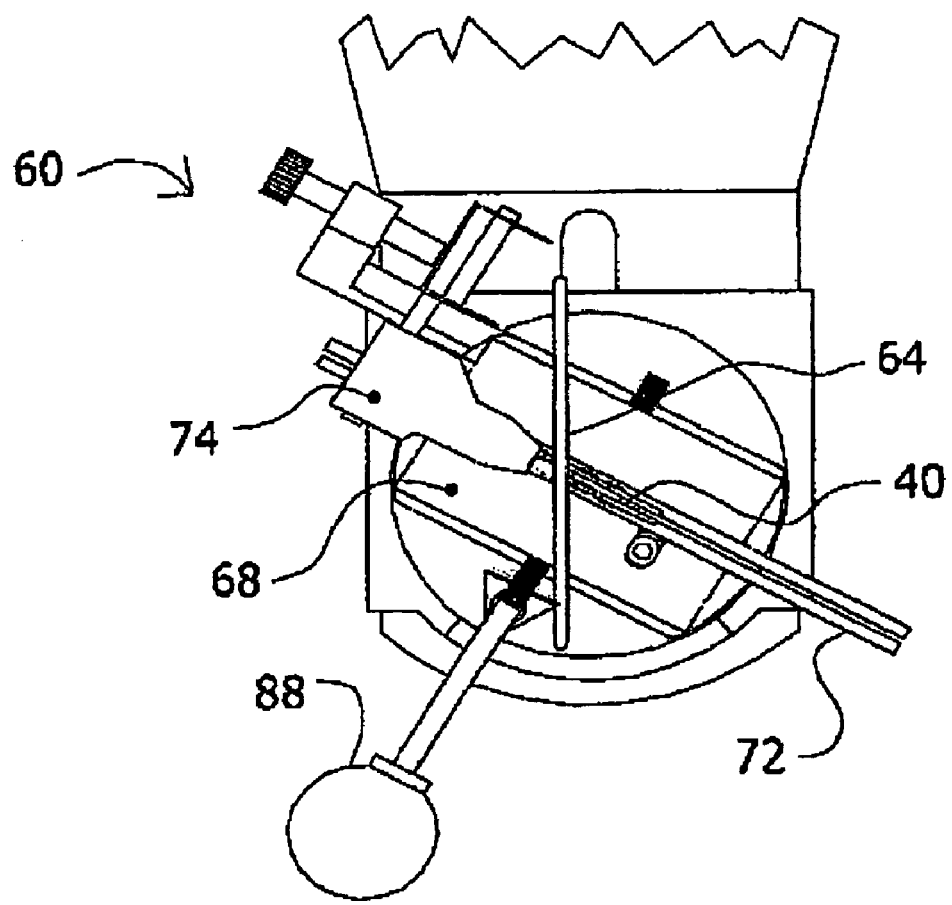
FIG. 6 is a detailed top plan view of the vise base assembly of FIG. 4 showing the vise in a closed position and the grinding wheel in phantom line.

FIG. 6 is a detailed top plan view of the grinder 60 showing the vise 72 in a closed position and showing the grinder wheel 64 in phantom line. The angular position of the chain vise assembly 68 has been adjusted to set the top plate angle 34. The cutter stop 74 has been longitudinally adjusted to set the top plate length 42.

Figure 7:
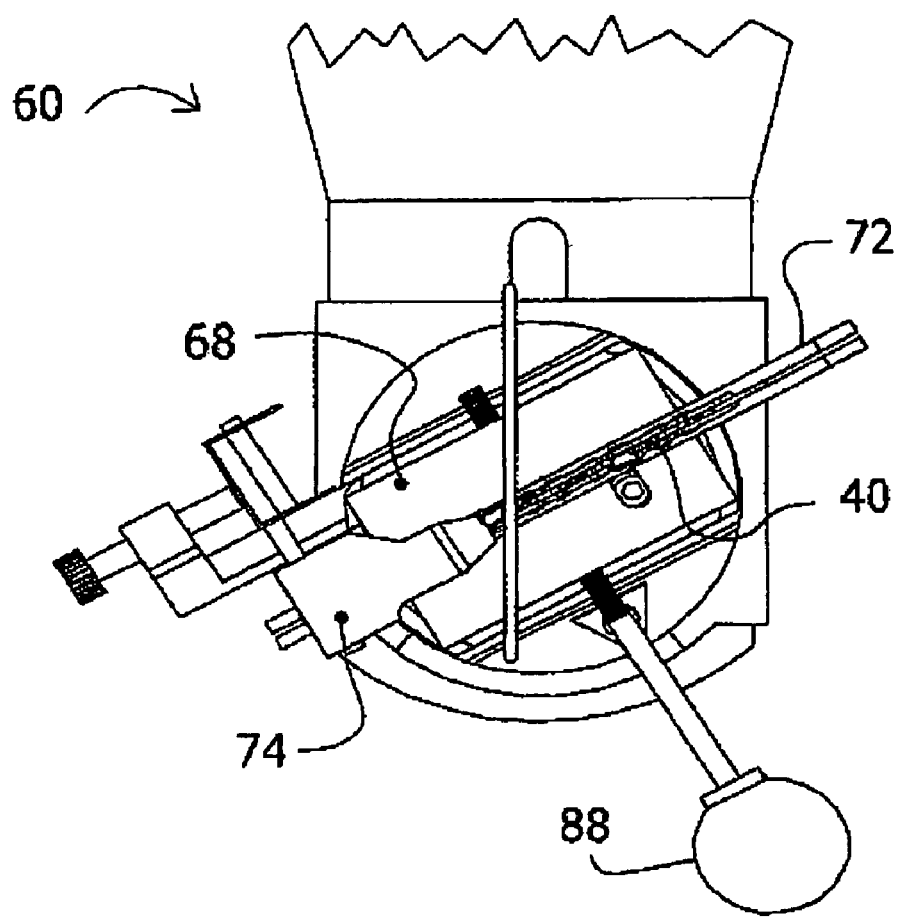
FIG. 7 is a detailed top plan view of the vise base assembly of FIG. 4 showing the vise rotated to grind an opposite hand cutter on the cutting chain.

FIG. 7 is a detailed top plan view of the grinder 60 showing the vise chain assembly 68 rotated to grind cutters 36 that are an opposite hand to the cutters 36 being ground in FIG. 6. The vise chain assembly 68 is rotated in FIG. 7 from its position in FIG. 6 about an angle twice the top plate angle 34 to correctly set the top plate angle 34 of the opposite handed cutters 36. The position of the cutter stop 74 need not be readjusted because the chain 40 remains centered on the axis of the rotation of the chain vise assembly 68. Adjusting the horizontal position of the upper vise base 76 (see FIG. 3), as described above, and the vertical position of the lower vise base 78 (see FIG. 3) further compensates for grinding wheel wear and insures accurate and consistent top plate lengths 42 and therefore accurate and consistent hook angles 48 between left and right handed cutters 36.

Figure 8:
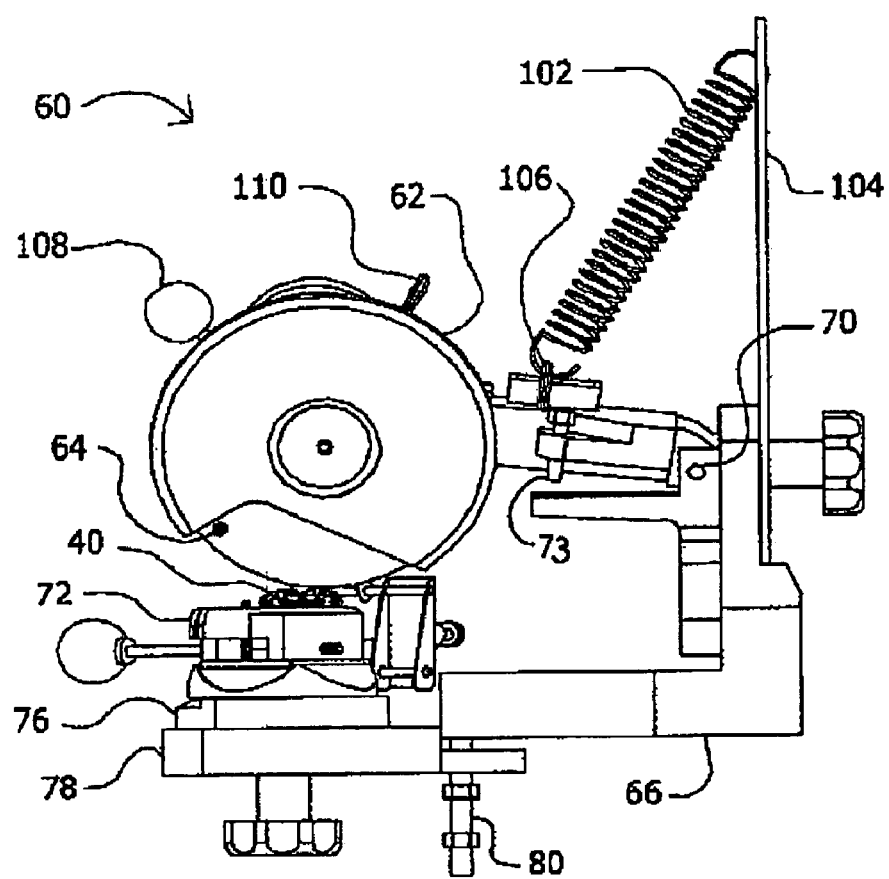
FIG. 8 is a detailed side elevation view of the chain grinder of FIG. 3 showing the grinding wheel in a grinding position.

FIG. 8 is a side elevation view of the grinder 60 showing light tension spring 102 biasing the grinding head 62 close to the cutting chain 40 in a grinding position. A first end of the light tension spring 102 attaches to a plate 104 that extends vertically above the grinder base 66 and hinge 70. The second end of spring 102 attaches to a grinding attach point 106 on the grinder head 62. The attachment to the plate 104 is shown as a hook, but a more permanent attachment could be used. The attachment to the grinding head 62 is shown as a hook to make moving this end of the spring easy. Other non-permanent attachments are also contemplated within the design.

Figure 1:
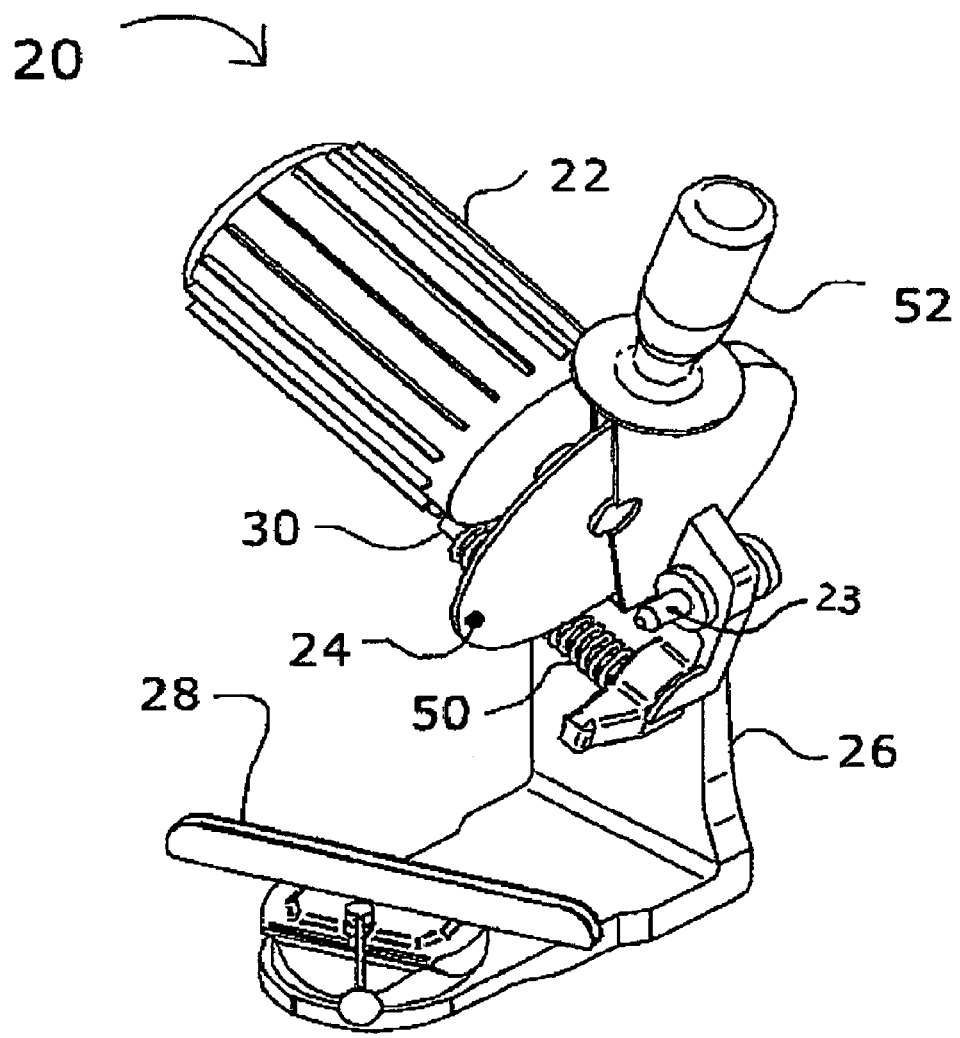
FIG. 1 is a perspective depiction of a current cutting chain grinder.
Figure 2:
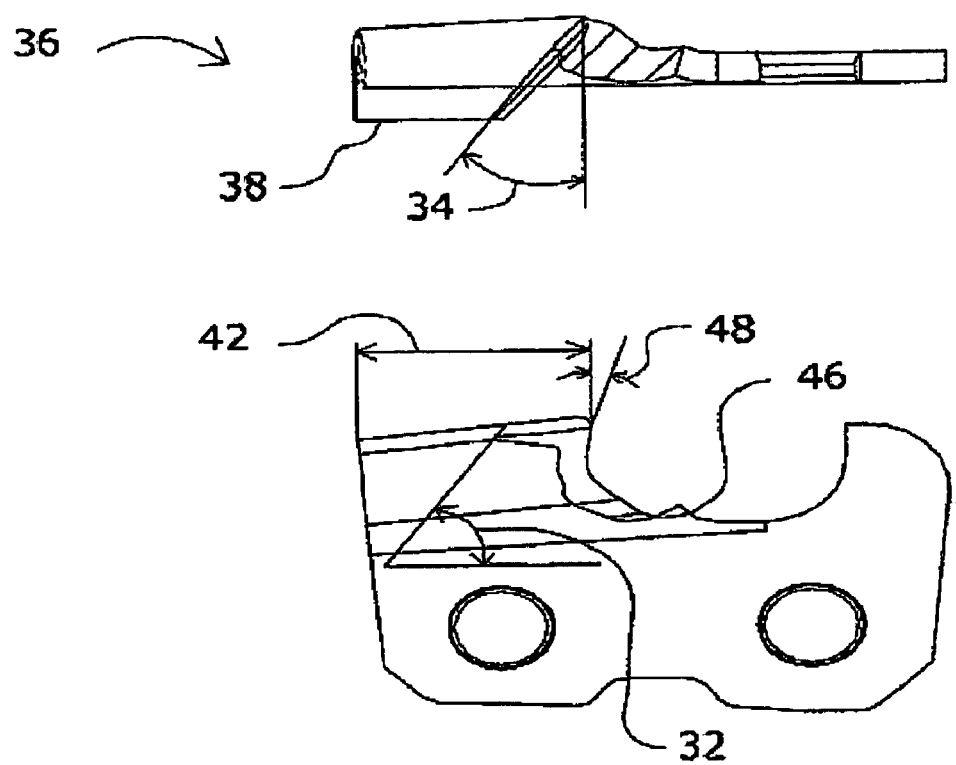
FIG. 2 is a side elevation and top plan view of a typical cutting chain cutter.

The light tension spring 102 replaces the stiff torsional spring 50 used in current grinders 20 as shown in FIG. 1. By using a lighter resistance than that provided by the torsional spring 50, an operator need only apply a small amount of force to handle 108 to cause the grinding wheel 64 to grind the cutter 36. By using light tension spring 102, the operator can feel the resistance of the grinding wheel 64 on the cutter 36 thereby preventing the operator from pressing down too hard and potentially burning the cutter 36.

Figure 9:
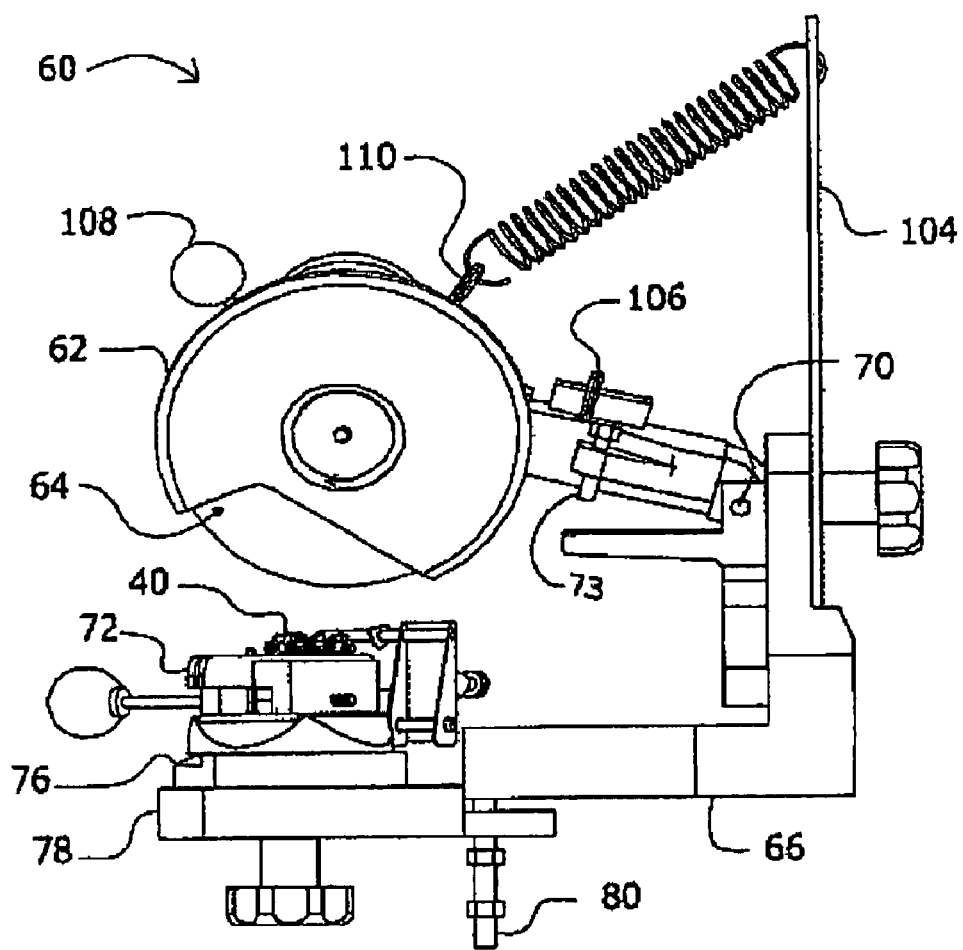
FIG. 9 is a detailed side elevation view of the chain grinder of FIG. 3 showing the grinding wheel in a dressing position.

FIG. 9 is a side elevation view of the grinder 60 showing the light tension spring 102 biasing the grinding head in a dressing position. Spring 102 attaches to dressing attach point 110 on the grinding head 62 to bias the grinding head 62 up and away from the cutting chain 40 and vise assembly 68 to allow an operator to dress the grinding wheel 64.

Figure 10:
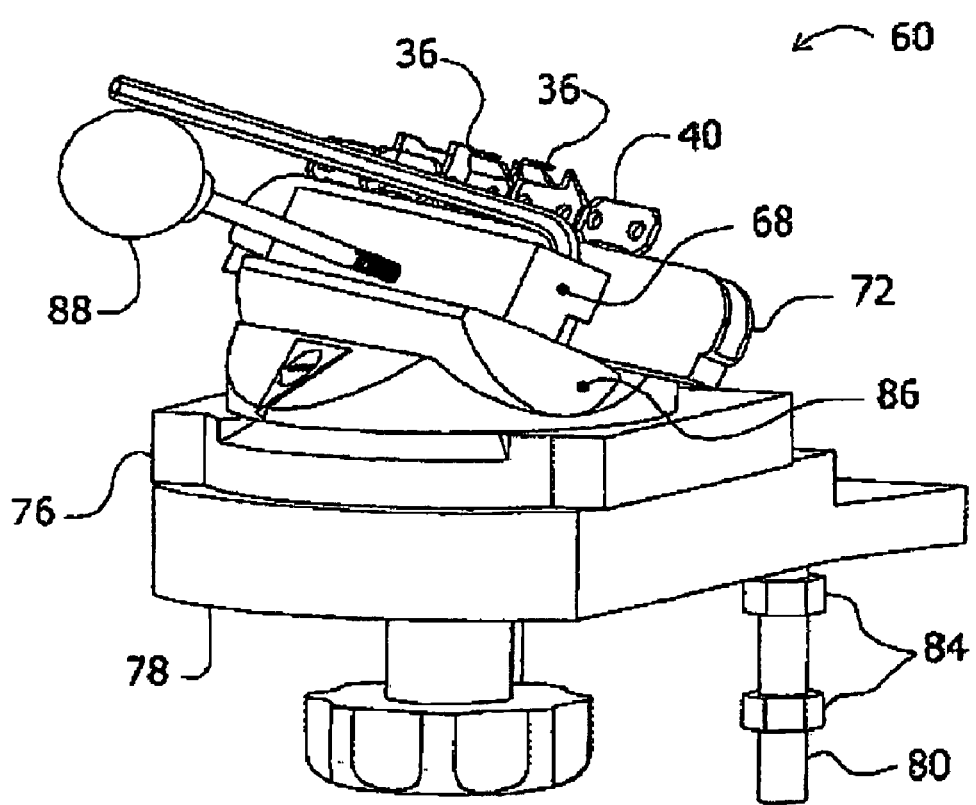
FIG. 10 is a detailed perspective view of the chain grinder of FIG. 3 showing the down angle positioner adjusted to rotate the cutting chain for sharpening an angle in the overthrow edge of a cutter.

FIG. 10 is a detailed perspective view of the grinder 60 showing the chain vise assembly 68 tilted on the down angle positioner 86 to grind a sharper angle at the overthrow edge 38 (see FIG. 2) of the cutter 36. In FIG. 10, the angle of tilt is exaggerated for illustration purposes. The chain vise assembly 68 and the down angle positioner 86 are shaped so that when the vise assembly 68 is tilted, the down angle positioner 86 rotates the vise assembly 68 around an axis of rotation defined by the longitudinal centerline of the cutting chain 40. By centering the rotation around the cutting chain centerline, consistency is maintained in the top plate length 42 and hook angle 48 even when switching between left and right handed cutters 36.

The preceding embodiments are exemplary. Those of skill in the art will recognize that the concepts taught herein can be tailored to a particular application in many other advantageous ways. In particular, those skilled in the art will recognize that the illustrated embodiments are but one of many alternative implementations that will become apparent upon reading this disclosure.

Although the specification may refer to "an", "one", "another", or "some" embodiment(s) in several locations, this does not necessarily mean that each such reference is to the same embodiment(s), or that the feature only applies to a single embodiment.

What is claimed is:

1. A cutting chain grinder, comprising:
   a grinder base;
   a grinding wheel mounted to a grinding wheel head, the grinding wheel head mounted to the grinder base and pivotable in a vertical plane; and a vise assembly adapted to hold a cutting chain in a grinding position with respect to the grinding wheel, where the vise assembly is rotationally adjustable about a first axis substantially normal to a longitudinal centerline of the cutting chain held in the vise assembly and the vise assembly is further rotationally adjustable about a second axis substantially normal to a plane formed by the first axis and the longitudinal centerline.

2. The grinder of claim 1 including:
a vertical support rigidly attached to the grinder base, the grinding wheel head pivotably mounted to the vertical support and further supported by a tension spring connected there between; and
a vise base mounted to the grinder base perpendicular to the vertical support and supporting a self centering vice portion of the vise assembly.

3. The grinder of claim 1 including an axis of rotation located at a centerline of the grinding wheel, wherein the grinding wheel rotates in a direction within the vertical plane.

4. The grinder of claim 1 including a horizontal adjustment device that adjusts a horizontal position of the vise assembly relative to the grinder base.

5. The grinder of claim 4 including a vertical adjustment device that adjusts a vertical position of the vise assembly relative to the grinder base.

6. The grinder of claim 1 wherein the second axis intersects the longitudinal centerline of the cutting chain.

7. The grinder of claim 1 including a cutter stop that positions the cutting chain in the vise assembly and does not require repositioning of the cutter stop after the grinder grinds a first side of the cutting chain and before grinding a second side of the cutting chain.

8. The grinder of claim 1 further including:
a tension spring having a first end and a second end;
a first attach point for attaching the first end to a member extending substantially vertically above the grinder base; and
a second attach point for removably attaching the second end to the grinding wheel head, the second attach point biasing the grinding wheel towards a lowered position for grinding the cutting chain.

9. The grinder of claim 8 including a third attach point for alternately attaching the second end to the grinding wheel head, the third attach point biasing the grinding wheel towards an elevated position for dressing.

10. The grinder of claim 9 wherein a direction of travel of the grinder between the lowered and elevated positions lies within the vertical plane.

11. A cutting chain grinder, comprising:
a grinder base;
a support arm rigidly connected and oriented substantially perpendicular to the grinder base;
a grinding wheel mounted in a grinding wheel head, the grinding wheel head mounted to the support arm and pivotable in a vertical orientation;
a tensions spring further connecting the grinding wheel to the support arm; and
a vise assembly including a clamp for holding a cutting chain, the vise assembly further including:
a vertical adjustment device for raising or lowering the clamp; and
a horizontal adjustment device for moving the clamp closer to or further away from the grinding wheel.

12. The grinder of claim 11, the vise assembly further including:
a rotational adjustment device for rotating the clamp about a vertical axis; and
a pivotable adjustment device for pivoting the damn about a horizontal axis perpendicular to the vertical axis, wherein a grinding angle of the cutting chain is adjustable without adjusting a position of the grinding wheel.

13. A cutting chain grinder, comprising:
a grinder base;
a grinding wheel mounted in a grinding wheel head, the grinding wheel head rotatably mounted to the grinder base; and
a clamping assembly including adjustable mechanisms for rotating a cutting chain in at least two axis of rotation that allow the grinding wheel to grind a left side and a right side of the cutting chain to a predetermined cutting angle, wherein the predetermined cutting angle can be varied without adjusting a position of the grinding wheel.

14. The grinder of claim 13 wherein the predetermined cutting angle can be varied in at least two different planes, a vertical plane that substantially coincides with a longitudinal centerline of the cutting chain, and a horizontal plane that substantially coincides with the longitudinal centerline of the cutting chain.

15. A cutting chain grinder for grinding a cutting chain, comprising:
a grinder base;
a grinding wheel mounted in a grinding wheel head, the grinding wheel head hinged to the grinder base and pivotable in a vertical plane to maintain the grinding wheel in a vertical orientation; and
a rotatable vise assembly mounted on the grinder base to position a left side cutter and a right side cutter of the cutting chain for grinding, wherein a grinding angle of the cutting chain is adjustable without reposition the grinding wheel.

16. The grinder of claim 15, the vise assembly including a pivoting mechanism for adjusting the grinding angle of the left and right side cutters; wherein the pivoting mechanism pivots the cutting chain in a direction perpendicular to a direction of rotation of the vise assembly.

17. The grinder of claim 15, further comprising a means for adjusting a down angle to be ground into a cutter on the cutting chain.

18. The grinder of claim 15 including a tension spring having a first end connected to the grinder base and a second end, wherein the second end is connected to a first attachment on the grinding wheel head during grinding of the cutting chain and wherein the second end is connected to a second attachment on the grinding wheel head during dressing of the grinding wheel.

19. The grinder of claim 15 including a vertical position adjustment mechanism for adjusting a position of the cutting chain relative to the grinder base.

20. The grinder of claim 19 including a horizontal position adjustment mechanism for adjusting the position or the cutting chain relative to the grinder base.

* * * * *